(12) United States Patent
Frankhuisen

(10) Patent No.: US 9,202,392 B2
(45) Date of Patent: Dec. 1, 2015

(54) LABEL FOR WET APPLICATIONS

(71) Applicants: Collotype Services Pty Ltd., South Australia (AU); Avery Dennison Materials Pty Ltd., South Australia (AU)

(72) Inventor: John Frankhuisen, South Australia (AU)

(73) Assignees: Collotype Services Pty Ltd. (AU); Avery Dennison Materials Pty Ltd. (AU)

( * ) Notice: Subject to any disclaimer, the term of this patent is extended or adjusted under 35 U.S.C. 154(b) by 0 days.

(21) Appl. No.: 14/444,433

(22) Filed: Jul. 28, 2014

(65) Prior Publication Data

US 2014/0331531 A1    Nov. 13, 2014

Related U.S. Application Data

(62) Division of application No. 10/552,880, filed as application No. PCT/AU2004/000186 on Feb. 18, 2004, now Pat. No. 8,790,759.

(30) Foreign Application Priority Data

Apr. 14, 2003 (AU) .................... 2003901771

(51) Int. Cl.
*B32B 23/00* (2006.01)
*B32B 1/02* (2006.01)
(Continued)

(52) U.S. Cl.
CPC ... *G09F 3/10* (2013.01); *B32B 5/18* (2013.01); *B32B 7/02* (2013.01); *B32B 27/08* (2013.01); *B32B 27/36* (2013.01); *B65D 23/14* (2013.01); *B65D 25/205* (2013.01); *G09F 3/02* (2013.01); *G09F 3/08* (2013.01); *B32B 2250/02* (2013.01); *B32B 2305/026* (2013.01); *B32B 2307/518* (2013.01); *B32B 2323/10* (2013.01); *B32B 2367/00* (2013.01); *B32B 2519/00* (2013.01);
(Continued)

(58) Field of Classification Search
CPC .......... B32B 27/08; B32B 27/36; B32B 5/18; B32B 7/02; B65D 25/205
USPC .......... 428/204, 205, 209, 483, 520, 500, 341, 428/212, 515, 317.9, 319.9, 34.2, 34.3, 428/34.6, 35.7
See application file for complete search history.

(56) References Cited

U.S. PATENT DOCUMENTS 5,691,043 A    11/1997 Keller et al.
6,761,969 B2   7/2004  Li et al.
(Continued)

FOREIGN PATENT DOCUMENTS

EP    0 358 445 A2    3/1990
JP    10-180970 A     7/1998
(Continued)

OTHER PUBLICATIONS

Decision on Opposition by Delegate of Commissioner of Patents of Australia, Sep. 16, 2008.

*Primary Examiner* — Ellen S Wood
(74) *Attorney, Agent, or Firm* — Akerman LLP

(57) ABSTRACT

A label for a bottle where the label is comprised of a laminate where an outer layer (3) is a material susceptible to losing opaqueness when made wet, and an inner layer (5) behind this first layer which is a material that is opaque, and such that it will maintain such opaqueness when wet.

21 Claims, 3 Drawing Sheets

(51) Int. Cl.
*G09F 3/10* (2006.01)
*B32B 7/02* (2006.01)
*G09F 3/02* (2006.01)
*G09F 3/08* (2006.01)
*B32B 5/18* (2006.01)
*B32B 27/08* (2006.01)
*B32B 27/36* (2006.01)
*B65D 23/14* (2006.01)
*B65D 25/20* (2006.01)

(52) U.S. Cl.
CPC .......... *Y10T 428/13* (2015.01); *Y10T 428/1303* (2015.01); *Y10T 428/1307* (2015.01); *Y10T 428/1317* (2015.01); *Y10T 428/1334* (2015.01); *Y10T 428/1352* (2015.01); *Y10T 428/249953* (2015.04); *Y10T 428/28* (2015.01); *Y10T 428/2848* (2015.01); *Y10T 428/3179* (2015.04); *Y10T 428/31786* (2015.04); *Y10T 428/31797* (2015.04)

(56) References Cited

U.S. PATENT DOCUMENTS

| 7,673,909 | B2 | 3/2010 | Rousselet |
| 2002/0146559 | A1 | 10/2002 | Touhsaent |

FOREIGN PATENT DOCUMENTS

| WO | 91/16025 | A1 | 10/1991 |
| WO | 9116025 | A1 | 10/1991 |

LABEL FOR WET APPLICATIONS

CROSS-REFERENCE TO RELATED APPLICATIONS

This application is a divisional of U.S. patent application Ser. No. 10/552,880, filed Oct. 12, 2006, which is a §371 National Phase of PCT/AU2004/000186, filed Feb. 18, 2004, the entirety of which is incorporated herein by reference.

This invention relates to labels, to containers using labels and a method of construction of a label particularly where such labels, or the container are to be used in wet applications.

BACKGROUND ART

The problem to which this invention is directed relates to the difficulty of labels, especially but not limited to those being used on bottles, after the label has become wet, losing a preferred appearance.

It is well recognized that the attractiveness of some products depends upon the ongoing good appearance of labels present on the outside of a container containing the product.

Such a situation certainly applies to wine, and especially those wines that might normally be subjected to moisture during cooling or being kept cool, such as some white wines.

While it is known to use coated papers for the production of some labels, many prefer the appearance of uncoated labels which have, for some, a preferred appearance.

The problem with an uncoated paper surface is however, that where this is subjected over a period to humidity or liquid, infusion of the liquid into the paper will cause the appearance of the paper to change, and the paper also might pucker.

Furthermore, when the label is exposed to moisture for some time, the label can become completely saturated and due to the inherent composition of paper, can become susceptible to damage as it becomes fragile. If the damage is significant, the label can become an eyesore. Furthermore, as the label becomes saturated it then loses opacity, which affects the visual appearance of not only the label, making it difficult to read, but also detracts from the overall appearance of the bottle itself.

Under some conditions, the moisture can affect the adhesive holding the label to the bottle, so that the label will become detached from the bottle making identification of the contents troublesome.

Even though the label itself may not separate from the container to which it is attached under such wet conditions, nonetheless it is considered highly disadvantageous for ongoing best appearance that such a label simply does not look as good once it has been wet.

This has caused significant difficulty and there have been previous unsuccessful attempts to overcome this problem.

One way in which others have attempted to overcome this problem is by laminating the back of uncoated paper with a clear plastic film.

Unfortunately, this did not appear to provide a substantive solution.

However, the discovery of this invention has been that if an under-laminate layer is provided which is opaque, being such that the opaqueness will not of itself be removed when the material is wet, then this can provide a way of solving the general problem.

When the under-layer is opaque, the colour can then be selected and the effect of wetness can be controlled to maintain as desired, a selected wet appearance as distinct from the dry appearance of a label.

In this specification, the terms under layer and inner layer are to be considered as interchangeable and define the layers that are between the outer layer and the bottle.[DA 1]

In one form of this invention there is proposed a label for a bottle where the label is comprised of a laminate where an outer layer is a material susceptible to losing opaqueness when made wet, and an inner layer behind this first layer which is a material that is opaque, and such that it will maintain such opaqueness when wet.

In preference the label has an outer material adhering to an inner [DA2] material, the inner material comprised of a material that is a film of plastics material.

In preference the plastics material is white.

In a further form of the invention this can be said to reside in a label for a bottle which includes an upper layer of uncoated paper and an under layer of plastics material which is opaque, the uncoated paper being secured to the under layer by a permanent adhesive.

In preference, the under layer material is chosen so as to provide a stable laminate base for the uncoated paper upperlayer, and provides an, underneath surface appropriate for attachment.

In preference, the attachment is achieved with glue.

In preference, such a container is a glass bottle.

In a further form, the invention can be said to reside in the combination of such a label when adhered to a container.

In preference, the container is a bottle, which is comprised of translucent glass.

In preference there is provided a label where the label is a laminate where an outermost layer is an uncoated paper, and a plastics film is permanently adhered to a back of such outer layer further characterized in that the plastics material is a biaxial polypropylene, and it has an opaqueness that is greater than 0.54 as measured by a Tobias densitometer.

In preference the biaxial orientated polypropylene is a material manufactured as a five layer extruded film with a cavitated inner core.

In the alternative, the plastics film is selected from any one of a biaxial orientated polypropylene, polyethylene, non-orientated polypropylene or PET.

In yet a further form of the invention, the label is applied directly onto a sheet of extruded plastics film.

In preference, the outer most layer is joined to the under layer by being applied directly onto a sheet of extruded plastics material.

In preference, the extruded plastics film is then attached to a bottle.

In preference, the attachment is achieved with glue.

In a further form of the invention there is a label for a bottle where the label is a laminate where an outermost layer upon which there is printed indicia is a material susceptible to losing opaqueness when made wet, and where there is a lower or more inner layer of the laminate which is an inner layer behind this first layer which is a material that is opaque, and such that it will maintain substantial opaqueness when wet.

In preference, the label is further characterized in that the lower or inner layer is in fact an innermost layer.

In preference, the lower or inner layer is a plastics material.

In preference, the label is further characterized in that the laminate has each layer of the laminate joined to adjacent layers by water insoluble means or materials.

In preference, the water insoluble means are a fusion of plastics material with a respective adjacent layer.

In yet a further form of the invention there is a container having a label secured to an outermost surface thereof where the label is as previously characterized, where an or the inner most layer of the laminate is adhered directly onto an outer surface of the container with substantially water insoluble means or material, and where the outer most layer is positioned to be outermost with respect to the container so a to display the printed indicia thereon.

BRIEF DESCRIPTION OF THE DRAWINGS

For a better understanding of this invention it will now be described with relation to a specific embodiment which will be described with the assistance of drawings wherein.

Figure 1:
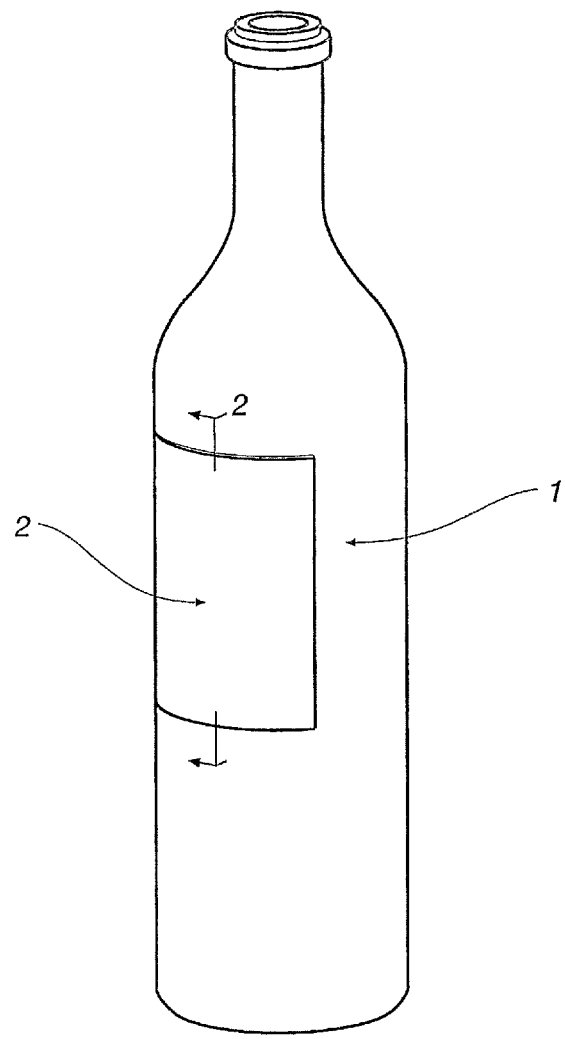
FIG. 1 is a perspective view of a bottle to which a label is attached and FIG. 2 is a cross-sectional view along the lines 2-2 in FIG. 1.
Figure 2:
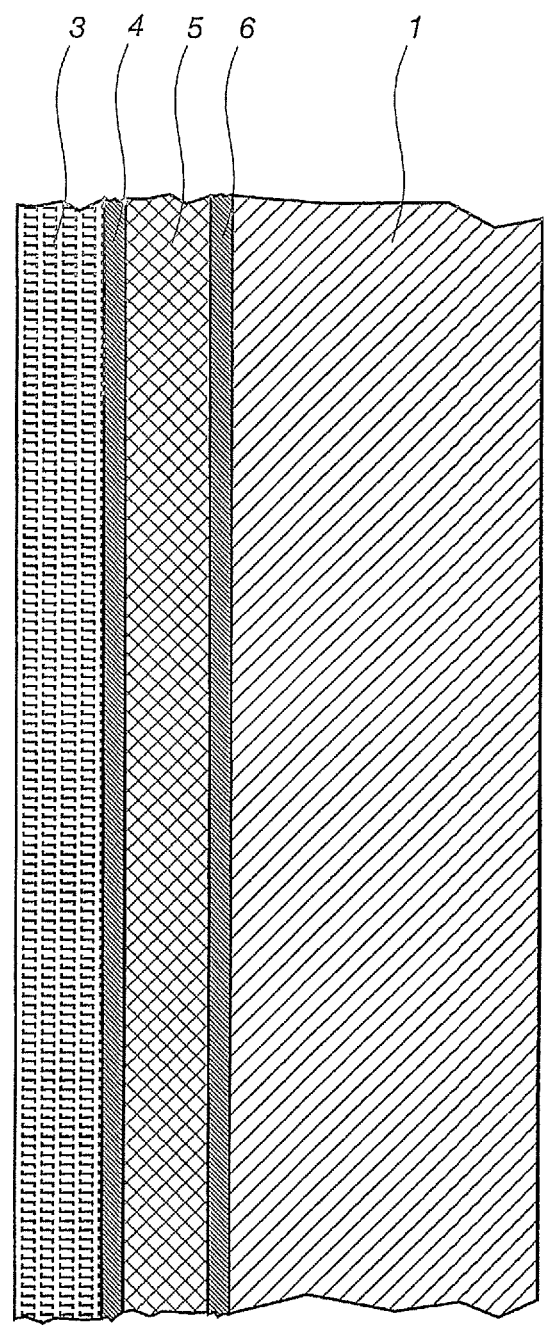

The challenge has been to provide a label that has an uncoated surface that provides for many, a preferred surface appearance and texture.

However, uncoated paper is inherently vulnerable to absorption of water and the results of inundation either simply by condensation, or inundation of water are such that it creates then an appearance that is not preferred.

This appearance includes a change of colour and the effect can be somewhat irregular.

Also, there is a problem that such wetting will cause the paper to differentially swell or contract.

We firstly therefore adhered to the back of uncoated paper a plastics material film.

This then acted to hold the uncoated paper when they were inundated together but the appearance still had the irregular change in colour, which looked much less desirable.

By having a plastic film, which could also be opaque adhered to the back of the uncoated paper, substantially reduced this difficulty.

Especially then if the colour of the film was white, this then provides the dual benefits of both providing a secure holding together of the uncoated paper material as well as an appearance that, even when the uncoated paper is saturated, does not change its appearance substantially, and maintains therefore a significantly improved appearance over what was the case hitherto.

Referring specifically to the drawings there is therefore a bottle 1 to which is adhered a label 2. The label 2 is made as a laminate with an outer layer 3, which is an uncoated paper, and this is adhering through a glue 4 to an inner film 5 which is the plastics material. The glue 6 may or may not be the same as glue 4.

Figure 3:
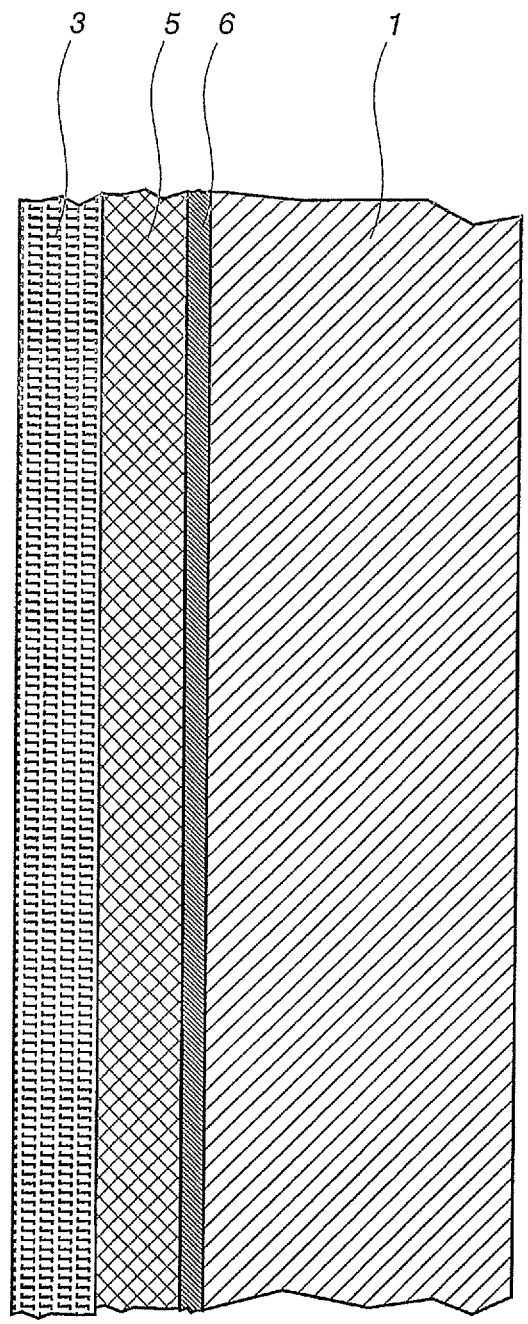
FIG. 3 is a cross-sectional view of further embodiment of the invention.

In a further embodiment of the invention, and with reference to FIG. 3, the outer layer 3 is applied directly onto a sheet of extruded plastics material 5. This then results in the bonding of the label to the plastics material without the need for any adhesive. Such techniques are well known to those skilled in the art. The resulting product can then be attached to a bottle 1, or other container, by way of a glue 6. In the printing of labels, a stock is therefore provided where for instance the label is to be a self-adhesive label, that has an uncoated upper layer and an effectively permanent adhesive which is then glued to an underlying plastics material film which in this case is a biaxial orientated polypropylene.

In this case this is manufactured as a five layer extruded film with a cavitated inner core for opacity and stiffness.

The colour of the film is white and it had a sufficient opaqueness so that it has an optical density greater than 0.54 as measured by a Tobias densitometer.

The stock material is supplied when in a self-adhesive format on a glassine backing which is then supplied for application to containers.

It would be well understood by a person skilled in the trade that the backing may differ according to certain applications or preferences and may well include PET backing, KRAFT backing or other such backing without departing from the scope of the invention.

In the case of wine, this is therefore to glass bottles, and the advantage of the invention is especially apparent for glass bottles, which have a lighter or fully transparent colouring and character.

The label according to this invention can then be applied in the traditional way from the glassine backing onto bottles.

It is considered that any of a number of plastic materials can be selected for this application and these can be for instance polyethylene film, non-orientated polypropylene film, or PET film.

In order to have a sufficient opacity, in each case, such a film would be either filled with an appropriate filler giving it a sufficient opacity for the purpose or it can be tinted again to be sufficient to provide the effective purpose.

While an indication of opacity has been given, the degree of opacity that is useful in any case can be established by very simple experiment and it would not be intended in the broadest sense that the degree of opacity should be necessarily constrained to the specific reference given.

Throughout this specification the purpose has been to illustrate this invention and not to limit this.

The invention claimed is:

1. A label of laminate construction, comprising:
an outer layer for receiving printed indicia on an exposed surface thereof; and
an under layer attached to the outer layer, the under layer being attachable to a surface, wherein the outer layer is made of a material that has an opacity, wherein the opacity of the outer layer material reduces after the outer layer is exposed to moisture or liquid, and
the under layer is made of a different material that has an opacity, wherein the opacity of the under layer material, after exposure of the under layer to moisture or liquid, is configured not to be affected in the same manner as the opacity of the outer layer material,
wherein the outer layer is adhered to the under layer, the under layer being a film of plastics material,
wherein the under layer has an optical density greater than 0.54 as measured by a Tobias densitometer, and
wherein the outer layer is paper.

2. The label as in claim 1, wherein the under layer is white.

3. The label as in claim 1, wherein the outer layer is secured to the under layer by a permanent adhesive.

4. The label as in claim 1, wherein the under layer is adapted to be a stable laminate base.

5. The label as in claim 4, wherein the under layer provides an innermost surface adapted to facilitate adhesion to an outer surface of a container.

6. The label as in claim 1, wherein the label is attached to the outer surface of a container by self-adhesive.

7. The label as in claim 1, wherein the label is attached to the outer surface of a container by a glue, which is applied to the label when the glue is wet and which is allowed to dry when in situ on the container.

8. The label as in claim 6, wherein the container is a glass bottle.

9. The label as in claim 7, wherein the container is a glass bottle.

10. The label as in claim 1, wherein the plastics material comprises at least one of the group consisting of biaxial polyethylene, non-orientated polypropylene and PET.

11. The label as in claim 1, wherein the under layer is a biaxial oriented polypropylene plastic film.

12. The label as in claim 11, where the biaxial polypropylene plastic has opaqueness greater than 0.54 as measured by a Tobias densitometer.

13. The label as in claim 12, wherein the biaxial oriented polypropylene plastic film under layer is a five layer extruded film.

14. The label as in claim 13, wherein the biaxial oriented polypropylene plastic film under layer has a cavitated inner core.

15. The label as in claim 2, wherein the outer layer is joined to the under layer by being applied directly onto a sheet of extruded plastics material.

16. A label for a bottle wherein the label is a laminate, comprising:
   an outermost layer upon which there is printed indicia; and
   a lower or more inner layer that is coupled between the outermost layer and the bottle, wherein the outermost layer is made of a material that has an opacity that reduces after the outermost layer is exposed to moisture or liquid;
   the lower or more inner layer is made of another material that has another opacity that is substantially unaffected by exposure of the lower or more inner layer to moisture or liquid; and the lower or more inner layer is a plastics material,
   wherein the lower or more inner layer has an optical density greater than 0.54 as measured by a Tobias densitometer, and
   wherein the outermost layer is paper.

17. The label as in claim 16, wherein the lower or inner layer is an innermost layer.

18. The label as in claim 16, in which the lower or inner layer is a plastics material.

19. The label as in claim 16, wherein the laminate has each layer of the laminate joined to adjacent layers by water insoluble means or materials.

20. The label as in claim 19, wherein the water insoluble means are a fusion of plastics material with a respective adjacent layer.

21. The label as in claim 16, wherein the label is secured to an outermost surface of the bottle,
   wherein the innermost layer of the laminate is adhered directly onto an outer surface of the bottle with substantially water insoluble means or material, and
   wherein the outermost layer is positioned to be outermost with respect to the bottle so as to display the printed indicia thereon.

* * * * *